United States Patent
Lingarajappa

(10) Patent No.: US 10,754,557 B2
(45) Date of Patent: Aug. 25, 2020

(54) DATA STORAGE SYSTEM WITH ASYNCHRONOUS DATA REPLICATION

(71) Applicant: Seagate Technology LLC, Cupertino, CA (US)

(72) Inventor: Chetan Bendakaluru Lingarajappa, Bangalore (IN)

(73) Assignee: Seagate Technology LLC, Fremont, CA (US)

(*) Notice: Subject to any disclaimer, the term of this patent is extended or adjusted under 35 U.S.C. 154(b) by 97 days.

(21) Appl. No.: 15/715,996

(22) Filed: Sep. 26, 2017

(65) Prior Publication Data

US 2019/0095112 A1 Mar. 28, 2019

(51) Int. Cl.
*G06F 3/06* (2006.01)
*G06F 12/14* (2006.01)

(52) U.S. Cl.
CPC ............ *G06F 3/0619* (2013.01); *G06F 3/065* (2013.01); *G06F 3/067* (2013.01); *G06F 3/0608* (2013.01); *G06F 3/0613* (2013.01); *G06F 3/0617* (2013.01); *G06F 3/0641* (2013.01); *G06F 3/0656* (2013.01); *G06F 3/0689* (2013.01); *G06F 12/1408* (2013.01); *G06F 2212/1052* (2013.01)

(58) Field of Classification Search
CPC .... G06F 3/0619; G06F 3/0646; G06F 3/0647; G06F 3/0655
See application file for complete search history.

(56) References Cited

U.S. PATENT DOCUMENTS

| | | | | |
|---|---|---|---|---|
| 5,546,395 | A | * | 8/1996 | Sharma .................. G10L 19/06 370/468 |
| 5,563,961 | A | * | 10/1996 | Rynderman .............. G06T 9/00 358/426.05 |
| 7,921,077 | B2 | | 4/2011 | Ting et al. |
| 8,356,017 | B2 | | 1/2013 | Akirav et al. |
| 8,495,304 | B1 | | 7/2013 | Natanzon et al. |
| 8,543,609 | B1 | | 9/2013 | Natanzon |
| 8,874,863 | B2 | | 10/2014 | Mutalik et al. |
| 8,914,595 | B1 | | 12/2014 | Natanzon |
| 8,996,460 | B1 | | 3/2015 | Frank et al. |
| 9,110,914 | B1 | | 8/2015 | Frank et al. |
| 9,244,967 | B2 | | 1/2016 | Provenzano et al. |
| 10,459,798 | B2 | * | 10/2019 | Lingarajappa .......... G06F 3/064 |
| 2004/0055020 | A1 | * | 3/2004 | Delpuch .................. H04N 5/76 725/134 |
| 2005/0138306 | A1 | * | 6/2005 | Panchbudhe ....... G06F 11/2094 711/162 |
| 2006/0235676 | A1 | * | 10/2006 | Wu ........................ G10L 19/04 704/1 |
| 2013/0145105 | A1 | * | 6/2013 | Sawicki ................ G06F 3/0619 711/147 |
| 2017/0123679 | A1 | * | 5/2017 | Yoshii ........................ G06F 3/06 |
| 2018/0011914 | A1 | * | 1/2018 | Doherty ................ G06F 3/0619 |
| 2018/0335962 | A1 | * | 11/2018 | Rostagni ............... G06F 3/0619 |

* cited by examiner

*Primary Examiner* — Ponnoreay Pich
(74) *Attorney, Agent, or Firm* — Hall Estill Attorneys at Law

(57) ABSTRACT

Asynchronous data replication between source and target data storage devices of a data storage system can be directed by a connected network controller. A source data set to be replicated from the source data storage device to the target data storage device may be stored in a staging cache while portions of the source data set are parsed by the network controller so that less than all of the source data set is transferred to the target data storage device.

20 Claims, 4 Drawing Sheets

DATA STORAGE SYSTEM WITH ASYNCHRONOUS DATA REPLICATION

SUMMARY OF THE INVENTION

A data storage system, in accordance with some embodiments, has a network controller connected to a source data storage device and a target data storage device. The network controller directs a source data set stored in the source data storage device to a staging cache where the source data set is parsed so that less than all of the source data set is transferred to the target data storage device during asynchronous replication of the source data set.

Various embodiments connect a replication buffer logically between a source data storage unit and a target data storage unit. A source data set is directed from the source data storage unit to the replication buffer with a replication controller of the replication buffer as part of an asynchronous data replication. The source data set is transformed into a target data set as directed by the replication controller. The target data set has no duplicate data blocks and no superfluous data blocks while being transferred to the target data storage unit.

In other embodiments, a replication buffer logically connected between a source data storage unit and a target data storage unit. A source data set is directed from the source data storage unit to the replication buffer with a replication controller of the replication buffer. A write receipt is issued by the replication controller while the source data set is stored in the replication buffer. The source data set is transformed into a target data set as directed by the replication controller. The target data set has no duplicate data blocks and no superfluous data blocks while being transferred to the target data storage unit. The target data set transferred after the write receipt is issued by the replication controller.

DETAILED DESCRIPTION

As increasing amounts of computing is conducted virtually with computing resources being separated from the terminal being used by a user, data replication is becoming more prevalent. For instance, a virtual computing machine can be established at any number of different computing terminals, which results in operating and personal data being replicated from a source data repository to the target computing terminal. Such data replication can be expensive in terms of network bandwidth and overhead processing, particularly when numerous data updates are conducted on the source data.

Accordingly, various embodiments are generally directed to optimized data replication in a data storage system that efficiently processes and transfers data between a host source and a target. The ability to parse replicated data into unique blocks of data allows for data deduplication and compression operations to be conducted without degrading the data access performance of the data storage system. By asynchronously replicating data with a replication buffer, system resources can efficiently be scheduled to replicate data with enough time and resources to provide increased security while occupying decreased bandwidth.

Figure 1:
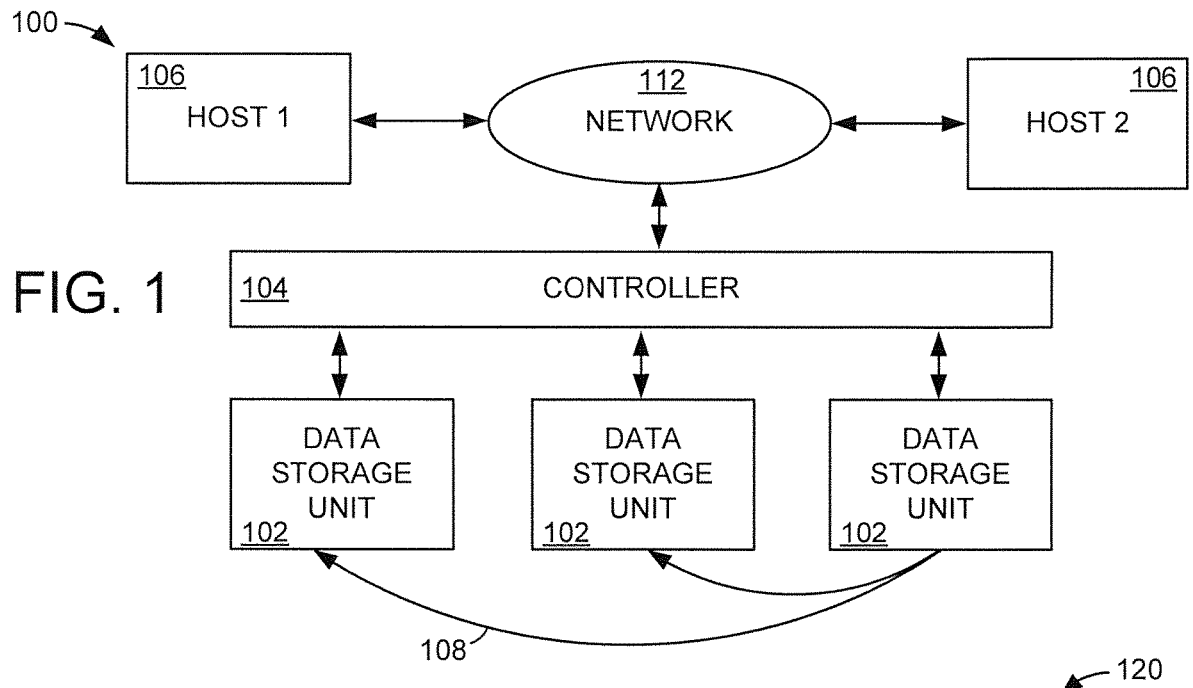
FIG. 1 is a block representation of an example data storage system arranged in accordance with various embodiments.

FIG. 1 is a block representation of an example data storage system 100 arranged in accordance with various embodiments. Any number of data storage units 102 can be individually and collectively accessed by one or more network controllers 104 that provide data access to at least one remote host 106. The data storage units 102 can be actual data storage devices or virtual machines that can generate, transfer, and locally store data.

When a data storage unit 102 is newly installed or activated, the network controller 104 can replicate data from other data storage units 102, as represented by arrows 108. It is noted that data replication can occur from a single supplemental data storage unit 102 or from multiple different data storage units 102 of the data storage system 100 sequentially or concurrently. The ability to replicate data allows the data storage system 100 to recover from encountered errors and failures, provide any number of virtual machine terminals, and distribute data to increase resiliency to unit failures.

Figure 2:
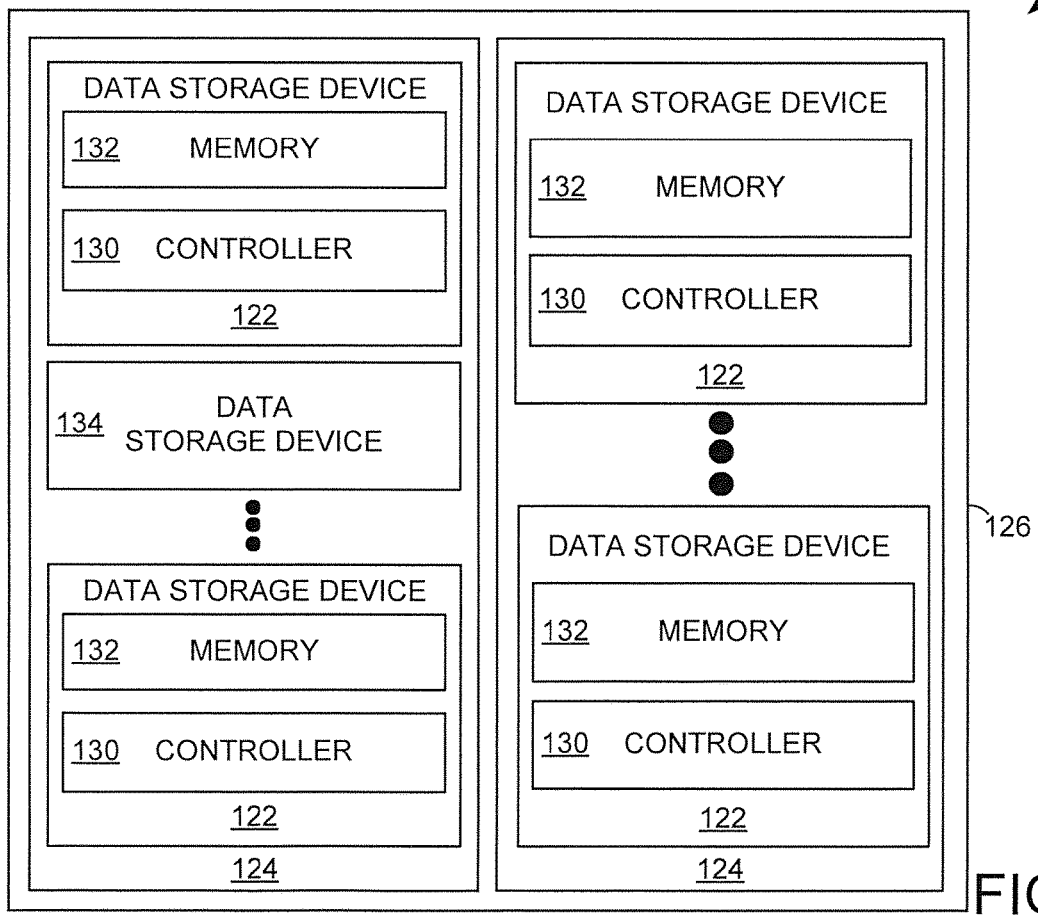
FIG. 2 displays a block representation of a portion of an example data storage system configured in accordance with some embodiments.

FIG. 2 displays a block representation of an example data storage unit 120 that may be employed in the data storage system 100 of FIG. 1 in accordance with some embodiments. The data storage unit 120 may consist of any number (N) of data storage devices 122 that may be physically proximal, or distal, to one another. That is, multiple data storage devices 122 can be physically proximal by being resident in a common enclosure 124 and/or common rack 126 at a single physical location. Multiple data storage devices 122 may, alternatively, be distal by being positioned in different physical locations, such as different cities, counties, states, countries, and/or hemispheres.

Regardless of the locational relationship of data storage devices 122 interconnected via one or more wired and/or wireless networks 128, each data storage device 122 can comprise a local controller 130, such as a programmable processor, microprocessor, or intelligent circuitry, that direct data access operations to, and from, a local memory 132, such as a non-volatile solid-state array, rotating magnetic media, or hybrid combination of multiple different types of data storage memory. It is contemplated that a data storage device 122 does not have a local controller 130 and/or local memory 132 and instead is a virtual machine, as shown by device 134, that utilizes the controller 130 and/or memory 132 of other devices 122 in the data storage system.

Figure 3A:
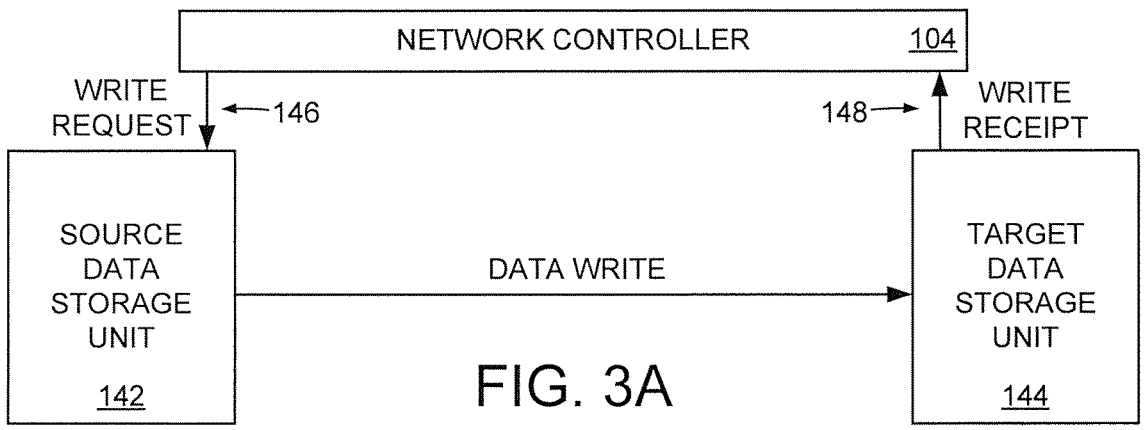
FIGS. 3A and 3B respectively convey block representations of portions of an example data storage system operated in accordance with assorted embodiments.
Figure 3B:
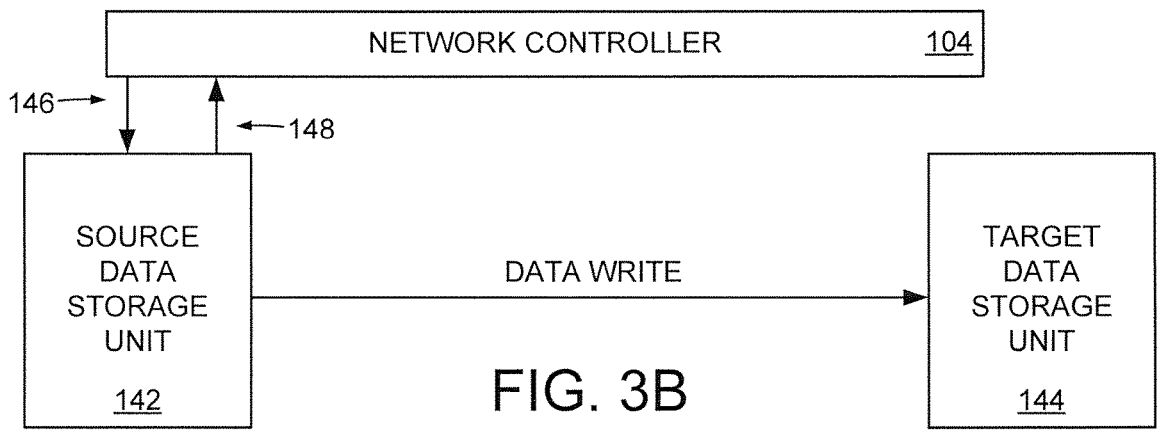

While data can be moved, changed, removed, and added to any one or more of the data storage devices 122 as directed by the network controller 104, assorted situations call for some, or all, of the data stored in a data storage device 122 to be replicated to a different data storage device 122, such as virtual machine 134. FIGS. 3A and 3B respectfully convey block representations of portions of an example data storage system 140 configured and operated to conduct data replication operations in accordance with various embodiments. The data storage system 140 has at least one source data storage unit 142 designated to be partially, or completely, replicated in a data storage unit target 144.

A network controller 104 may schedule and execute the data replication between the data source 142 and target 144. In the synchronous data replication operation of FIG. 3A, the network controller 104 replicates data by issuing a data write request 146 that triggers at least some of the data of the source 142 to be immediately written to the target 144, which is followed by issuance of a receipt 148 once the data has been replicated. Such synchronous replication conducts an atomic write operation where the write receipt 148 is not issued until data is actually present in the target 144.

The synchronous data replication shown in FIG. 3A can ensure data has been written to the target 144, which avoids data loss and data collisions, but is subject to latencies of the network, data source 142, data target 144, and network controller 104. As such, synchronous data replication can be processing intensive and time consuming, particularly when large volumes of data are replicated and/or numerous replications are concurrently occurring in a data storage system.

FIG. 3B illustrates an example asynchronous data replication operation between the source 142 and target 144 where the write receipt 148 is issued prior to the actual writing of data to the target 144. The separation of the write request 146 and write receipt 148 allows asynchronous replication to actually conduct data replication and updates at the discretion of the network controller 104. That is, the network controller 104 can delay, organize, and execute pending data write requests 146 at times that minimally impact performance of the data storage system.

Asynchronous data replication further allows for efficient recovery from encountered errors and failures, compared to synchronous replication, by retaining pending and previously written data. However, the delay of write request 146 to actual data writing to the target 144 can correspond with the source data to change. Hence, asynchronous replication can be more efficient than synchronous replication, but can suffer from out-of-date versions of data being actually resident in a target 144. As a result, the network controller 104 may conduct incremental replication where updates to pending, and actually written, data are taken from the source 142 to bring the replicated data up-to-date.

It is noted that the incremental updating of data in asynchronous replication operations can produce data collisions, duplicate data, and data loss as more data updates are taken from the source 142 and applied to the replicated data. While online and/or offline data deduplication can be conducted at the source 142, but can result in multiple redundant copies of deduplicated data being transferred and/or incomplete deduplication of the source data. In addition, asynchronous data replication can suffer from unencrypted data being transferred across a network, which may expose the data to loss, interception, and alteration.

Figure 4:
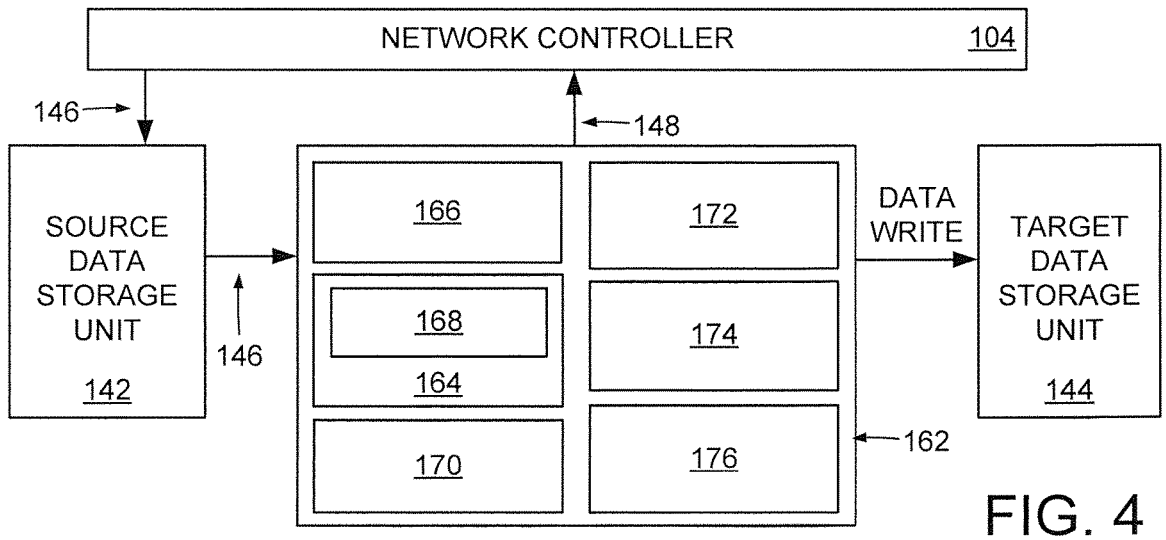
FIG. 4 illustrates a block representation of a portion of an example data storage system arranged in accordance with various embodiments.

With these issues in mind, a data storage system, in assorted embodiments, is arranged to position a replication buffer logically between the source 142 and target 144 during a data replication operation to optimize asynchronous data replication. FIG. 4 depicts a block representation of a portion of an example data storage system 160 that can provide optimized asynchronous data replication in accordance with some embodiments. The data storage system 160 has a replication buffer 162 positioned, logically, between the data source 142 and the data target 144.

The replication buffer 162 may be physically positioned anywhere in the data storage system 160 and, in some embodiments, is resident in the network controller 104. In other embodiments, the replication buffer 162 is resident in a rack server or in a data storage device other than the source 142 and target 144. Regardless of the actual physical position of the replication buffer 162, the controller 104 can direct asynchronous replication support operations with the various capabilities of the buffer 162.

The replication buffer 162 can have a local non-volatile memory 164 that may be complemented by one or more secondary volatile memory cache locations in the replication buffer 162, or in other regions of the data storage system 160. The non-volatile memory 164 can be allocated by the network controller 104 and/or a replication controller 166 to store past encountered data storage activity in a log 168. That is, actual data storage access operations and performance metrics, such as source, target, read latency, write latency, replication timer, system processing load, and number of replication updates, may be monitored and logged by at least one controller 104/166 in the replication buffer 162.

The non-volatile memory 164 may further be utilized to temporarily store replication data in the log 168 in order to optimize an asynchronous replication operation between a source 142 and target 144. Storage of replication data in the log 168 allows any number of operations to be executed to ensure the data replicated to the downstream target 144 is unique and configured for efficient utilization of system 160 resources. Although not required or limiting, the replication buffer 164 can have deduplication circuitry 170, inspection circuitry 172, compression circuitry 174, and encryption circuitry 176 that can be active concurrently, sequentially, and individually on replication data stored in the log 168 or being streamed through the replication buffer 164 without being stored in the log 168.

It is noted that the various circuitry 170/172/174/176 of the replication buffer 162 may be physically separate circuits, such as an application specific integrated circuit, or can collectively packaged as hardware, such as in a programmable processor that is supplemental to the replication controller 166. Upon activation by the network 104 and/or replication 166 controller, the deduplication circuitry 170 can find duplicate blocks of data passing through the replication buffer 162. That is, the deduplication circuitry 170 can compare data being replicated with data previously replicated, or data resident in the target 144, and evict non-unique data blocks from the replication data set sent from the buffer 162 to the target 144.

The deduplication circuitry 170 can involve hash calculations with the data existing in the target 144 being the key and the data location (logical block address) of the data being replicated being the value. In some embodiments, the deduplication circuitry 170 conducts byte-level comparisons alone, or after hash calculations, such as if there is a weak hash key match. By comparing current replication data to previously read, and/or evicted, data blocks, the deduplication circuitry 170 can efficiently operate without thrashing. Upon deduplication, the deduplication circuitry 170 may notify at least one controller 104/166 to evict, delete, or ignore portions of the replication data so that only unique data blocks flow downstream to the target 144 from the replication buffer 162.

The inspection circuitry 172 can identify the presence of abnormalities and superfluous data in a data set being replicated, which can comprise multiple constituent data blocks that are made up of constituent bytes of data. For instance, the inspection circuitry 172 can identify a data block comprising only zeros or a potential data collision upstream, or within, the target 144. The inspection circuitry 172 can assess present and past data transfers to seamlessly integrate incremental snapshots of the source 142 to previous replicated data from the source 142.

In other words, the inspection circuitry 172 may assess data incoming from the source 142 as a snapshot, which can be characterized as data originating from a source that has previously been replicated to a particular target 144, and perform operations, such as higher level deduplication operations, to ensure only unique data blocks are transferred to the target 144. Such inspection is particularly useful with updates to previously replicated sources where a majority of the data blocks are not unique.

With the deduplication 170 and inspection 172 circuits eliminating superfluous, duplicate, and other non-unique data blocks, the compression circuitry 174 compresses the size of the unique data blocks flowing from the replication buffer 162 to the target. The compression circuitry 176 may use one or more types of compression algorithms, such as lossless, lossy, and Lempel-Ziv, that reduce the size, but not the volume, of data being sent downstream to the target 144. It can be appreciated that such compression can optimize transmission by reducing the bandwidth utilized during replication.

In some embodiments, the network 104 and/or replication controller 166 can utilize the inspection circuitry 172 to select one or more compression algorithms that are conducive to the amount of bandwidth available between the buffer 162 and the target 144, which are subsequently executed on the unique data blocks by the compression circuitry 174. For instance, the compression circuitry 174 may compress deduplicated data with, or without, blocks evicted by the inspection circuitry 172 with a first compression algorithm and then by a different second compression algorithm in response to a detected, or predicted, change in available bandwidth to the target 144.

The encryption circuitry 176 can be activated by the network 104 and/or replication 166 controller to increase the security associated with a data block transmitted to the target 144. The encryption circuitry 176 can select one or more encryption algorithms, such as symmetric-key, public-key, cipher, and block-chain, to decrease the risk of an unauthorized user gaining access to the data sent to the target 144.

It is noted that the use of the encryption circuitry 176 can be expensive in terms of system resources and time. As such, the replication controller 166 can selectively activate the encryption circuitry 176 in response to detected, and/or predicted, system conditions. As a non-limiting example, the replication controller 166 can predict a reduction in processing capability and/or network bandwidth and adjust the type of encryption algorithm being utilized, the timing of the encryption by the encryption circuitry 176, and the data packet size being sent to the target 144. Much in the same way, the replication controller 166 can alter the type and timing of the compression of data to make more system resources, and perhaps time, available to be used for encryption operations, which can allow data security levels to be maintained despite reduced system resources being available.

Through the intelligent prediction and/or reaction to system conditions, the replication controller 166 can optimize how, and if, the various circuitry 170/172/174/176 operates to process data from a source snapshot to a target snapshot. The ability to locally store replication data in the buffer memory 164 allows the buffer 162 to be utilized as a staging area during asynchronous data replication where the replication controller 166 choreographs the identification of unique data blocks along with the enhancement of data transmission to the target 144 via the compression 174 and encryption 176 circuits that takes into account the real-time current data storage system conditions as well as any conditions predicted to occur.

Figure 5A:
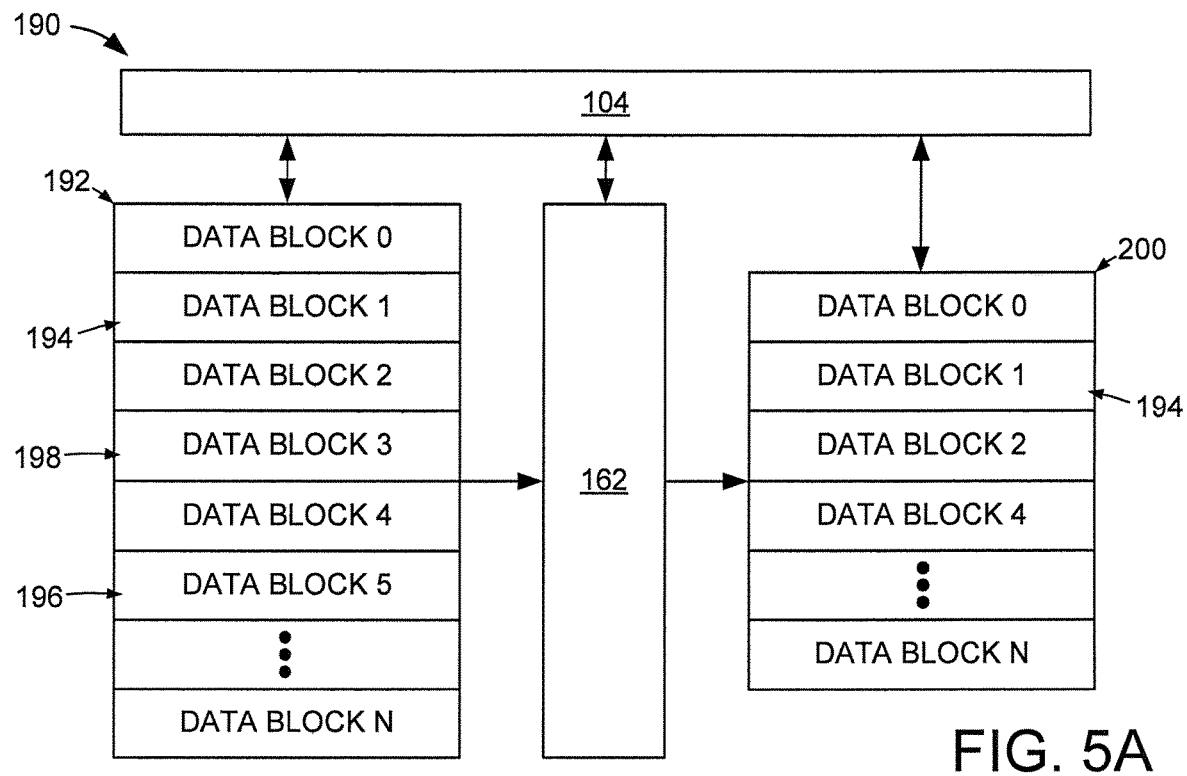
FIGS. 5A and 5B respectively depict block representations of portions of an example data storage system operated in accordance with some embodiments.
Figure 5B:
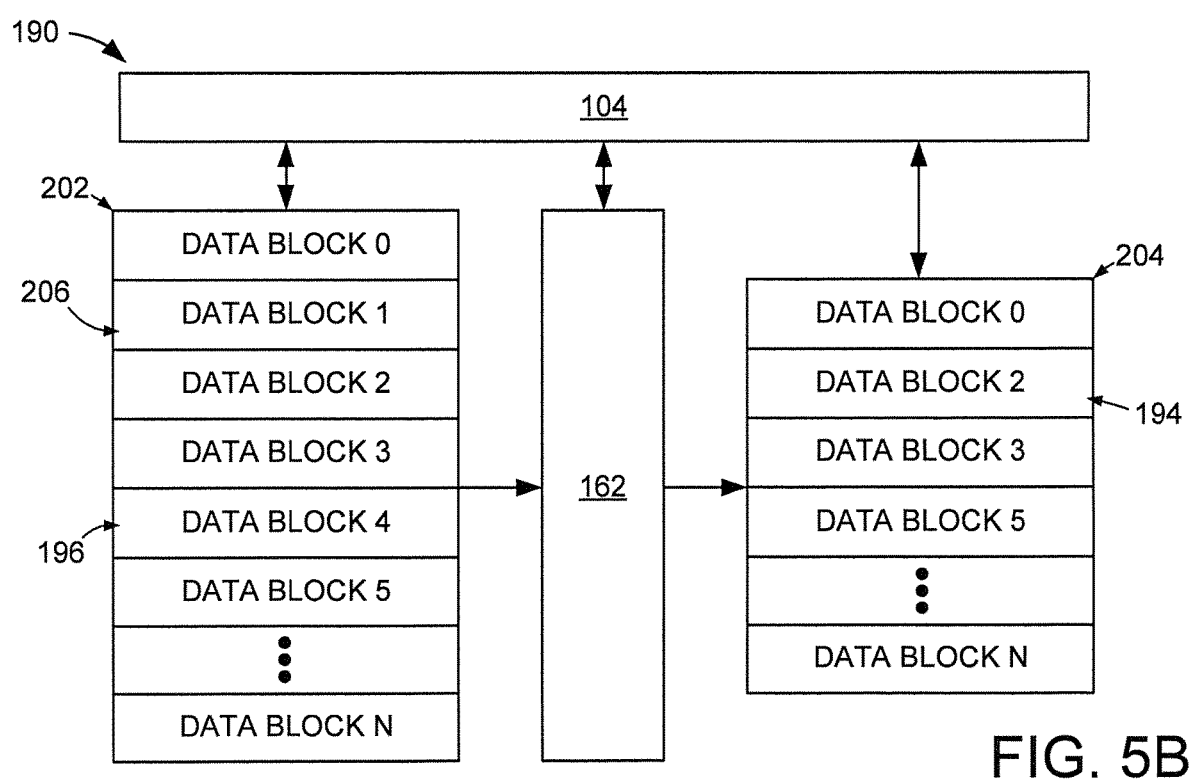

FIGS. 5A and 5B respectively convey block representations of an example replication buffer 190 that can be utilized in the data storage systems 100/160 of FIGS. 1 & 4 in accordance with various embodiments. The assorted operations and activity of FIGS. 5A and 5B can be conducted by the replication controller 166, which may be supplemented by a network controller 104. In FIG. 5A, a source data set 192 is shown, which can be characterized as replication data, entering the replication buffer 162. It is noted that the source data set 192 is resident in at least one source data storage units 142.

The source data set 192 has a plurality of constituent data blocks 194 that can be similar, or dissimilar, sizes. It is contemplated that at least one data block has all zeros 196, which may indicate an empty or error block. It is further contemplated that at least one data block is a redundant copy 198 of another data block. Such redundancy may be in the form of out-of-date and up-to-date versions of data or in the form of exact matches.

The target data set 200 represents the source data set 192 after being processed by the replication buffer 162. The target data set 200 has the all zeros 196 and redundant copy data blocks removed, which results in a smaller data set size. It is noted that the target data set 200 may be further compressed and/or encrypted before actually being sent to the target 144.

FIG. 5B illustrates how one or more updates to the source data storage unit triggers a snapshot source data set 202 to be sent to the replication buffer 162 in order to get the most-current version of data in the target data storage unit 144 via a snapshot target data set 204. As displayed, the snapshot source data set 202 has duplicate data 206 that may be duplicates of data present in another block of the snapshot source data set 202 or a block stored in the target data storage unit 144.

Regardless of the type of redundant data, the replication buffer 162 evicts the duplicate data 206 and the all zeros data block 196 so that the snapshot target data set 204 has a size that is less than the snapshot source data set 202 and less than the target data storage unit 144. That is, the replication buffer 162 can reduce snapshot (incremental) data sets by evicting duplicate 206 and superfluous, such as all zeros blocks 196, so that less than all of the target data storage is updated. Such reduction in data blocks 194 being transmitted to the target 144 is more efficient than re-writing the entire snapshot source data set 202 to the target 144. Furthermore, the reduction of data blocks 194 by the replication buffer 162 can reduce the number of data access operations to the target 144, which is particularly beneficial if the target data storage unit 144 utilizes memory that degrades with regard to the number of data writes, such as flash memory.

Figure 6:
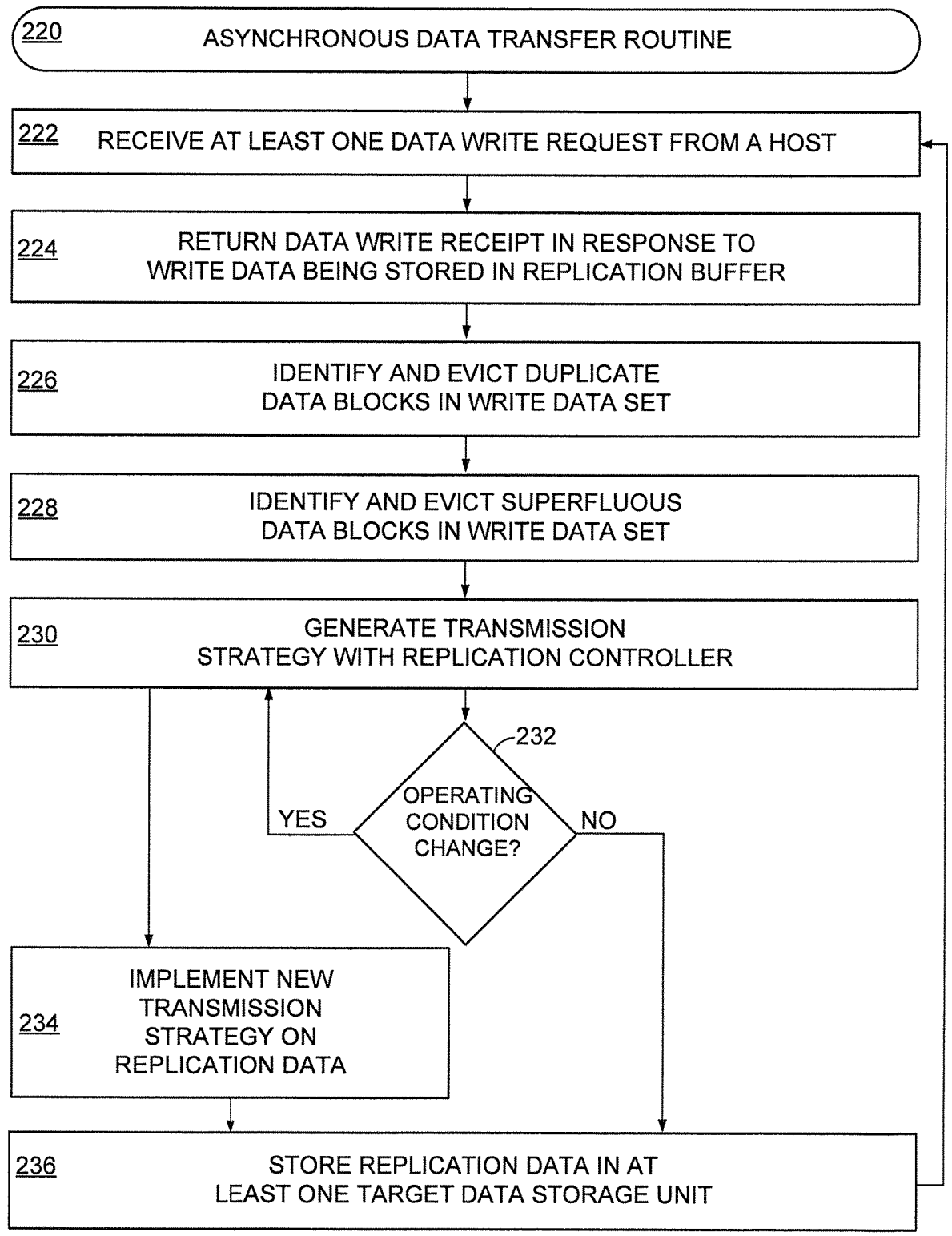
FIG. 6 provides a flowchart of an example asynchronous data transfer routine that can be carried out by the data storage systems of FIGS. 1-4.

FIG. 6 is a flowchart of an example asynchronous data transfer routine 220 that can be carried out in accordance with some embodiments with the data storage systems 100/160 of FIGS. 1 & 4. It is noted that the data transfer routine 220 occurs in a data storage system, such as systems 100 of FIG. 1 and 160 of FIG. 4, where at least one source data storage unit is connected to at least one target data storage unit via a network that comprises a network controller. It is contemplated that asynchronous data replication can be choreographed by the network controller between a single source data storage unit and multiple separate target data storage units.

While a data storage system can engage in synchronous data replication where a data write request returns a write receipt only after completion of the data write, routine 220 is directed to asynchronous data replication where a data write request from a source to at least one target in step 222 triggers step 224 to return a data write receipt once the data to be replicated is stored in a replication buffer as directed by a replication controller. In some embodiments, steps 222 and 224 coincide with a complete replication of the source data storage unit while other embodiments replicate less than all of the data in the source data storage unit or snapshots of previously replicated portions of the source data storage unit.

Once the data to be replicated is stored in local memory of the replication buffer in step 224, the replication controller, perhaps in combination with the network controller, can begin to identify duplicate and superfluous data blocks in step 226 with the deduplication circuitry of the replication buffer. Step 226 proceeds to evict any data blocks of the pending data stored in the replication buffer with other data blocks of the pending data, as well as data blocks previously transferred to the source data storage unit(s). That is, step 226 can compare pending replication data with a log of data previously transferred to a source data storage unit to prevent duplicate, redundant, and non-unique data from being transferred to the target.

The deduplication of step 226 can occur individually, or in combination with the inspection circuitry being activated by the replication controller in step 228. The inspection circuitry identifies and evicts data blocks that are superfluous, such as all zero, unused, and error blocks. As generally illustrated in FIGS. 5A & 5B, the deduplication and inspection circuits can produce a target data set that has only unique data blocks with respect to itself and the target data storage unit that are non-superfluous.

Although the target data set could be sent to the target data storage unit after step 228, assorted embodiments proceed to step 230 where a transmission strategy is generated by the replication controller. The transmission strategy can evaluate current real-time, as well as predicted future, data storage system conditions, such as data write latency, read latency, processing load, and number of pending data access operations, to determine what data compression and encryption algorithms to execute on the unique data blocks resulting from steps 226 and 228.

Step 230 can predictively evaluate any number of combinations of data compression scenarios with the compression circuitry of the replication buffer along with any number of data encryption scenarios with the encryption circuitry of the replication buffer to optimize the transmission of the unique data blocks to the target data storage unit. The result of step 230 can be the execution of only compression, or only encryption, on unique, non-redundant replication data.

Alternatively, step 230 results in both the compression and encryption of pending data resident in the replication buffer to produce a target data set that has both a smaller data size and a greater data security level than the pending replication data sent from the source data storage unit to the replication buffer. The optimization of the compression and/or encryption algorithms for current, and predicted, data storage system conditions allows system performance, such as data access latency and error rate, to be maintained despite the replication of data. Such optimization allows the data storage system to transfer the target data set while other system operations, such as other data accesses, are performed instead of waiting for a pause in system activity or a period of low processing overhead.

By conducting step 230 with respect to detected and predicted system conditions, the target data set can be transferred at any time. However, system conditions can change rapidly and unexpectedly. Hence, decision 232 continuously, or sporadically, evaluates system operating conditions and performance for alterations from the conditions and performance that resulted in the compression and/or encryption schemes executed in step 230. A change in system conditions/performance triggers a return to step 230 that develops a new data compression/encryption strategy, which may, or may not, be different than the strategy initially generated for the replication data. Step 234 then implements that new compression/encryption strategy on the replication data set.

As a non-limiting example, decision 232 returns routine 220 to step 230 where a different compression and encryption strategy is generated and executed on the replication data, which may result in multiple different compression and/or encryption operations to be conducted on the replication data in an effort to adapt to the new data storage system conditions and performance metrics. It is contemplated that decision 232 can detect a change in system conditions with less than all of the replication data transferred and sends the non-transferred replication back to the replication controller for a new compression/encryption strategy.

When the current data storage system conditions match, or are within acceptable tolerances, of the conditions that resulted in the compression/encryption strategy of step 230, decision 232 advances routine 220 to step 236 where the replication data is stored in the target data storage unit. Step 236 can involve the decompression and/or decryption of the replication data, but such is not required. The storage of replication data in the target data storage unit can be an update to previously transferred replication data, or can be a completely original replication data set. At the conclusion of step 236, routine 220 can be cycled any number of times to update data resident in one or more target data storage units.

In general, the replication controller can operate the replication buffer as a staging area for the target data storage unit where non-unique and/or superfluous data blocks are evicted from a source data set to produce a target data set that can be optimized by a compression and/or encryption strategy. A non-limiting example flow of routine 220 has a snapshot of the source data storage unit taken, which triggers a counter to increment and the replication controller to find any delta between different snapshots of the source unit and then transfer that delta to the target data storage unit. As a result of routine 220, a target data set is transferred that has duplicate blocks and all zero data blocks removed.

Through the utilization of a mid-stream replication buffer, instead of conducting data evaluations and optimizations in the source data storage unit, data can be asynchronously replicated with only unique, non-redundant, and non-superfluous data blocks that have heightened data security levels. The evaluation and adaptation of a target data set to detected and predicted data storage system conditions allows a replication controller to maintain system performance despite replicating large volumes of data between a source and one or more target data storage units.

What is claimed is:

1. A system comprising a replication buffer logically positioned between a source data storage unit and a target data storage unit, a replication controller of the replication buffer configured to direct a source data set stored in the source data storage unit to the replication buffer after prediction of a reduction in processing capability with the replication controller and an adjustment of a type of encryption algorithm being utilized based on the predicted reduction in processing capability, transform the source data set into a target data set by identifying and removing a potential data collision from the source data set, encrypt the target data set with the replication controller with the adjusted type of encryption algorithm, and transfer the target data set to the target data storage unit as part of asynchronous data replication, the target data set having no duplicate data blocks and no superfluous data blocks.

2. The system of claim 1, wherein a network controller is connected to the source data storage unit, target data storage unit, and replication buffer.

3. The system of claim 1, wherein the source data set is stored in a non-volatile memory of the replication buffer.

4. The system of claim 1, wherein the replication buffer comprises a deduplication circuitry and an inspection circuitry.

5. The system of claim 1, wherein the replication buffer comprises a compression circuitry and an encryption circuitry.

6. The system of claim 1, wherein the target data storage unit is a virtual machine.

7. A method comprising:
connecting a replication buffer logically between a source data storage unit and a target data storage unit,
directing a source data set from the source data storage unit to the replication buffer with a replication controller of the replication buffer as part of an asynchronous data replication;
transforming the source data set into a target data set with the replication controller by identifying and removing a potential data collision from the source data set, the target data set having no duplicate data blocks and no superfluous data blocks;
predicting a reduction in processing capability with the replication controller;
adjusting a type of encryption algorithm being utilized based on the predicted reduction in processing capability;
encrypting the target data set with the replication controller with the adjusted type of encryption algorithm; and
transferring the target data set to the target data storage unit.

8. The method of claim 7, wherein the replication controller transforms the source data set with a deduplication circuitry evicting at least one duplicate data block.

9. The method of claim 7, wherein the replication controller transforms the source data set with an inspection circuitry evicting at least one superfluous data block and the potential data collision.

10. The method of claim 9, wherein the at least one superfluous data block is an all zeros data block.

11. The method of claim 7, wherein the target data set comprises unique and non-redundant data blocks.

12. The method of claim 7, wherein the replication controller generates a transmission strategy prior to the transforming step.

13. The method of claim 12, wherein the transmission strategy selects a single compression algorithm from a plurality of compression algorithms to apply to the source data set.

14. The method of claim 12, wherein the transmission strategy selects a first encryption algorithm form a plurality of encryption algorithms to apply to the source data set prior to adjusting the first encryption algorithm to a second encryption algorithm of the plurality of encryption algorithms in response to the predicted reduction in processing capability.

15. The method of claim 12, wherein the replication controller generates the transmission strategy with regard to current, detected data storage conditions in the target data storage unit.

16. The method of claim 12, wherein the replication controller generates the transmission strategy with regard to predicted data storage conditions in the target data storage unit.

17. The method of claim 7, wherein the replication controller alters a first transmission strategy to a different second transmission strategy in response to a detected change in data storage conditions in the target data storage unit, the replication controller recompressing the target data set as part of the second transmission strategy.

18. A method comprising:
connecting a replication buffer logically between a source data storage unit and a target data storage unit,
directing a source data set from the source data storage unit to the replication buffer with a replication controller of the replication buffer;
issuing a write receipt with the replication controller while the source data set is stored in the replication buffer;
transforming the source data set into a target data set with the replication controller by identifying and removing a potential data collision from the source data set, the target data set having no duplicate data blocks and no superfluous data blocks;
predicting a reduction in processing capability with the replication controller;
adjusting an encryption timing based on the predicted reduction in processing capability;
encrypting the target data set with the replication controller with the adjusted encryption timing; and
transferring the target data set to the target data storage unit after the write receipt is issued.

19. The method of claim 18, wherein the replication controller transfers the target data set to the target data storage unit without degrading data access performance to either the source or target data storage units.

20. The method of claim 18, wherein the source data set is a snapshot of previously replicated data from the source data storage unit.

* * * * *